United States Patent [19]

Madokoro et al.

[11] Patent Number: 5,519,523
[45] Date of Patent: May 21, 1996

[54] LIQUID CRYSTAL DISPLAY DEVICE WITH RESIDUAL RETARDATION COMPENSATED FOR IN LIQUID CRYSTAL LAYER

[75] Inventors: Hitomi Madokoro, Mobara; Ikuo Hiyama; Junichi Hirakata, both of Hitachi; Hidetoshi Abe; Katsumi Kondo, both of Katsuta; Masaaki Kitajima, Hitachiota; Shinichi Komura, Hitachi; Kenkichi Suzuki, Mobara; Osamu Itoh, Hitachi; Naoki Kikuchi, Mobara, all of Japan

[73] Assignees: Hitachi, Ltd., Tokyo; Hitachi Device Engineering Co., Ltd., Chiba, both of Japan

[21] Appl. No.: 972,807

[22] Filed: Nov. 6, 1992

[30] Foreign Application Priority Data

Nov. 8, 1991 [JP] Japan ............... 3-292701
Dec. 2, 1991 [JP] Japan ............... 3-317641
Dec. 2, 1991 [JP] Japan ............... 3-317642
Apr. 20, 1992 [JP] Japan ............... 4-099264

[51] Int. Cl.[6] ............... G02F 1/1335; G02F 1/137
[52] U.S. Cl. ............... 359/73; 359/93
[58] Field of Search ............... 359/73, 53, 93, 359/63

[56] References Cited

U.S. PATENT DOCUMENTS

| | | | |
|---|---|---|---|
| 4,387,133 | 6/1983 | Ichikawa et al. | 359/73 |
| 4,609,255 | 9/1986 | Leenhouts et al. | 359/63 |
| 4,802,742 | 2/1989 | Ichikawa et al. | 359/73 |
| 4,844,569 | 7/1989 | Wada et al. | 359/73 |
| 4,952,030 | 8/1990 | Nakagawa et al. | 359/102 |
| 4,973,137 | 11/1990 | Kozaki | 359/73 |
| 5,032,008 | 7/1991 | Yamamoto et al. | 359/73 |
| 5,119,220 | 6/1992 | Narita et al. | 359/73 |
| 5,126,866 | 6/1992 | Yoshimizu et al. | 359/63 |
| 5,157,529 | 10/1992 | Koopman et al. | 359/73 |
| 5,187,603 | 2/1993 | Bos | 359/73 |
| 5,196,953 | 3/1993 | Yeh et al. | 359/73 |

FOREIGN PATENT DOCUMENTS 3-013916  1/1991  Japan ............... 359/73

OTHER PUBLICATIONS

Kondo et al., "Application of a stress plate modulator to birefringence measurements in Transparent films", SEN-I Gakkai, vol. 36, No. 11 (1980), pp. 45-51.

*Primary Examiner*—Anita Pellman Gross
*Attorney, Agent, or Firm*—Antonelli, Terry, Stout & Kraus

[57] ABSTRACT

A liquid crystal display device comprising: (a) a liquid crystal layer arranged between substrates each having an electrode; (b) a pair of polarizers arranged so as to sandwich the liquid crystal layer; (c) a birefringent medium arranged between the liquid crystal layer and at least one of the polarizers, when a voltage is applied so that liquid crystal molecules at boundary regions facing said substrates have different tilt angles from other molecules, retardation in said birefringent medium being equal or close to remaining retardation due to the liquid crystal molecules at boundary regions, and the slow axis of said birefringent medium being set for an angle to compensate for said remaining retardation; and (d) control means for changing transmission of said liquid crystal layer by applying voltages of two or more values between said electrodes.

30 Claims, 10 Drawing Sheets

LIQUID CRYSTAL DISPLAY DEVICE WITH RESIDUAL RETARDATION COMPENSATED FOR IN LIQUID CRYSTAL LAYER

BACKGROUND OF THE INVENTION

The present invention relates to a field effect mode liquid crystal display device in which the retardation in its liquid crystal layer is compensated for to attain high contrast and good viewing angle characteristic, and an elliptical polarizer.

In order to realize a liquid crystal display device with high contrast, a display device is proposed in U.S. Pat. No. 4,844,569 in which two liquid crystal elements with their spiral structure twisted in the directions opposite to each other are stacked or birefringent plastic films are stacked. The birefringent plastic films are bonded to be stacked by bonding agent between a polarizer and an electrode substrate.

Previously known liquid crystal display devices capable of displaying a large capacity are those of a super-twisted nematic (STN) type and a thin film transistor (TFT) type. The STN liquid crystal display device which is characterized by a larger twist angle in a spiral liquid crystal layer has an excellent multiplexed driving characteristic.

However, in these liquid crystal display devices, a background color or a display color is colored by yellow or blue because of an interference color due to retardation which is a difference between a fast axis and a slow axis based on birefringence and optical activity of liquid crystal molecules. In order to cancel this interference color, for the state where a non-selective voltage is applied, liquid crystal cells opposite to each other in their twist direction which does not have any voltage applying means such as electrodes are stacked or birefringent plastic film is stacked on a liquid crystal cell, thereby compensating for the retardation.

FIG. 2A schematically shows the structure of a liquid crystal element when the non-selective voltage is applied. As seen from the figure, the birefringent plastic film (made of birefringent medium 3) is layered between a polarizer 1 and a substrate 5. The retardation in the birefringent medium 3 and that in the liquid crystal cell are substantially equal and opposite in their polarity. The typical value of the retardation is 800 nm or so.

Changes in the transmission when a voltage is applied to a liquid crystal cell according to the prior art are shown in FIG. 3. As seen from the figure, the retardation when a low voltage (non-selective voltage) is applied is compensated for to provide black display color. However, in the low voltage range where the alignment of liquid crystal molecules starts to change, the alignment including the degree of rising or twisting of the molecules is not stable so that the alignment direction is liable to be non-uniform. As a result, reduction in the contrast, uneven display and crosstalk occur, thereby attenuating the display quality.

The crosstalk is a phenomenon in which multiplex driving cannot place the non-display points (non-selective points) in a complete non-display state but places them in the half selective state, thereby reducing the contrast in the entire display image. This is due to that bias voltages are previously applied to all the electrodes for the purpose of enhancing the response speed so that the liquid crystal at the portion at issue responds slightly to the voltage application; thus the transmission is increased. A difference between the transmission in the state with slight response and that in an ideal non-selective state is called the crosstalk.

The crosstalk phenomenon is remarkable in a normally close system in which the black display is provided when the non-selective voltage is applied. The crosstalk phenomenon changes in accordance with the frequency component of a driving voltage applied. Assuming that in the change of the transmission when an AC voltage is applied to a liquid crystal cell, with the saturation transmission of 100%, the voltage providing the transmission of 10% is a threshold voltage, the crosstalk phenomenon occurs with less degree as the threshold voltage provides less change due to the frequency.

On the other hand, assuming that the twist angle of the nematic crystal is 90° and the product $\Delta n \cdot d$ (μm) of the thickness d of the liquid crystal and the refractive index anisotropy $\Delta n$ is 0.5 μm, the TFT liquid crystal display device can provide high contrast of 100:1 or more, multi-gray scale and multi-color display, but provides a greatly changed transmission and display color when it is viewed from its tilted direction (In the field of the TFT liquid crystal display device, $\Delta n \cdot d$ represents the retardation).

In order to obviate such an undesired phenomenon, it was proposed in JP-A-63-115137 that the twist angle in the nematic liquid crystal layer is set for 10°–80° and the product $\Delta n \cdot d$ (μm) of the thickness d of the liquid crystal and the refractive index anisotropy $\Delta n$ is set for 0.2–0.7 μm thereby to improve the viewing angle characteristic.

However, the contrast when the display device is viewed from its front was reduced owing to an increase in the black-transmission when the voltage for displaying black is applied. This is attributed to that the liquid crystal molecules in the neighborhood 21 of the substrate surface have not completely risen when the voltage is applied as shown in FIG. 2B. Specifically, if the twist angle is 90°, rubbing axes, i.e. alignment directions of the liquid crystal molecules are orthogonal so that the residual retardation is canceled. On the other hand, if the twist angle is 10°–80°, the alignment directions are not orthogonal so that the residual retardation is not canceled, thereby increasing the black-transmission.

SUMMARY OF THE INVENTION

An object of the present invention is to provide a field effect mode liquid crystal display device with high contrast, good viewing angle characteristic and excellent uniformity of the display even when a voltage is applied.

Another object of the present invention is to provide an elliptical polarizer used for the above field effect mode liquid crystal display device.

The summary of the present invention is as follows.
(1) In a liquid crystal display device including a pair of opposite substrates each with an electrode at least one of which is transparent, a liquid crystal layer sandwiched between the substrates, a pair of polarizers provided to sandwich the liquid crystal layer and a control circuit for applying two or more value voltages between the electrodes to change the transmission amount of light in the liquid crystal layer to control multi-gray scale display, in such a state that a voltage is applied so that the tilt angle of the liquid crystal molecules at the surface region of the liquid crystal layer facing each substrate is different from that of other liquid crystal molecules between the substrates, a birefringent medium having a retardation equal or close to the residual retardation at the surface region of the liquid crystal is located between at least one of the polarizers and the liquid crystal layer and the slow axis of the birefringent medium is set for the angle which is able to compensate for the residual retardation in the liquid crystal layer. The surface region is a region where liquid crystal molecules have not completely risen even when the voltage is applied. (2) The liquid crystal layer between the electrode substrates has a spiral structure.
(3) When a voltage higher than the lowest voltage in the two or more voltages is applied, the transmission amount of light in the liquid crystal display device is less than that when the lowest voltage is applied. (4) The birefringent medium is composed of two or more organic polymer films, the slow axis of each organic polymer films crosses the rubbing axis of the surface region of the liquid crystal layer facing each substrate, and assuming that the twist angle of the liquid crystal layer is θ, the product Δn·d (μm) of the thickness d of the liquid crystal and the refractive index anisotropy Δn is (0.0033×θ+0.1) μm, and Δn·d of the birefringent medium is (0.0025×θ−0.1)−(0.00025× θ−0.3) μm.
(5) An elliptical polarizer for the liquid crystal display device in which protective films are stacked with their intimated contact to sandwich a polarizer film for absorbing the polarized light in a prescribed direction, the protective films have birefringence, their slow axis crosses the absorption of the polarizer film and the retardation therebetween is 0.005–0.25 μm.

The liquid crystal display device according to the present invention is called a field effect mode in which a voltage is applied between the electrodes to change the alignment of liquid crystal molecules so that their transmission is controlled. If nematic liquid crystal having positive dielectric anisotropy is used, the liquid crystal molecules when no voltage is applied are aligned at a prescribed pre-tilt angle from the electrode substrate. When the voltage applied between the electrodes located on the substrates is increased gradually, the alignment state of the liquid crystal molecules starts to change at a voltage equal to a certain value or more. As a result, the tilt angle changes with different values in the neighborhood of the substrate surface and at a central portion between the substrates so that the spiral structure starts to dissolve. The voltage at this time is called a threshold voltage. With the voltage which is sufficiently larger than the threshold voltage, the liquid crystal molecules are aligned in parallel to the electric field, i.e. perpendicularly to the electrode substrates. The retardation leading to coloring of the display is also decreased as the applied voltage. i.e. the alignment state of the liquid crystal molecules changes.

When the liquid crystal display device of the above item (1) using a certain liquid crystal material is subjected to 1/200 duty ratio driving by display elements with the multiplexed number of 200, its retardation was measured at the wavelength of light of 0.633 μm using a stress plate modulator disclosed in SEN-I GAKKAISHI, Vol. 36, No.11 (1980), pp. 45–51. The result is shown in FIG. 4. As seen from FIG. 4, the retardation is about 0.9 μm when no voltage is applied, and it is about 0.8 μm when a voltage in the neighborhood of the threshold voltage (about 2.2 V) is applied. When the voltage (4 V or more) which is sufficiently larger than the threshold voltage is applied, the liquid crystal molecules are aligned in the direction perpendicular to the electrode substrates and thus the liquid crystal approaches isotropic liquid. Accordingly, the retardation becomes 0.05 μm.

If the liquid crystal display device is driven in a multiplexed manner, the non-selective voltage corresponds to the threshold voltage. In the neighborhood of the threshold voltage, the molecules start to rise for the substrates and the spiral structure of the liquid crystal layer starts to dissolve so that the alignment state of liquid crystal molecules is very unstable and will change abruptly.

The liquid crystal display device in a normally close system which intends to provide the black display color in the above state cannot provide uniform black display color for the reason described above and provides reduced contrast. So the present invention adopts a normally open system which can provide the black display when the selective voltage is applied where the alignment of liquid crystal molecules is stable.

The display according to this system is characterized by a high white display transmission and a high contrast. It is advantageous when used for a reflective display device. In this case, if the contrast is set to be equal to that in the prior art case, polarizers having high transmission can be used to improve the transmission further.

A transmission type display device provides leaked light from between the electrodes when black display is provided. But the contrast can be improved by making a black matrix between the electrodes through chrome evaporation or printing of black die, otherwise by reducing the percentage of non-electrode portion occupied in a display portion, i.e. increasing a display area.

In the liquid crystal display device according to the present invention, the state of liquid crystal molecules when the selective voltage is applied is such that the spiral structure of the liquid crystal layer is dissolved and the molecules have risen substantially except the substrate surface region as shown in FIG. 2B. The retardation at this time is a very small surface-residual retardation 21 which is determined by only the liquid crystal molecules remaining on the substrate surface. This state corresponds to the state when about 2.5–3 V is applied in FIG. 4.

In order to provide complete monochromatic black and white display, the birefringent medium 3 having a retardation equal or close to the surface residual retardation 21 so that the retardation is set for the range of 0.1–0.15 μm considering the plot in FIG. 4. In order to provide black display at a higher voltage, the retardation must be set for the value smaller than 0.1 μm.

The birefringent medium may be located between the liquid crystal layer and one of the polarizers. If it is located between the substrates, attenuation in the transmission due to multi-reflection is reduced thereby improving the brightness.

The characteristic graph in FIG. 4 differs in accordance with liquid crystal materials. So the retardation in the birefringent medium is set for the different ranges according to the graph.

The twist angle in the liquid crystal layer is limited to 360° in its upper limit because in the multiplex driving for the STN liquid crystal display device, the lighting or selective state in the neighborhood of the threshold value results in the alignment liable to scatter light. It is also limited to its lower limit to 180° because of the contrast. Further, if it is desired to provide a liquid crystal element permitting monochromatic black and white display with satisfactory contrast to be made when 200 or more scanning lines are provided, the twist angle must be set for the range of 240°–270°. Further, if the twist angle is in the neighborhood of the integer-times number of 90°, the alignment directions of the liquid crystal molecules at the upper and lower substrate surfaces are orthogonal to each other. Thus, the above surface residual retardation is canceled to decrease so that the contrast is improved.

On the other hand, in the case of the TFT (thin film transistor) liquid crystal display device, it is generally said that the desired twist angle is 90° or so if the contrast is taken seriously. Thus, assuming that the twist angle is 90° and the product Δn·d (μm) of the thickness d of the liquid crystal and the refractive index anisotropy Δn is about 0.5 μm, the TFT liquid crystal display device can provide high contrast of 100:1 or more with the driving voltage of about 8 V. This is attributable to that the alignment directions of the liquid crystal molecules at the substrate surface regions are orthogonal to each other so that the above retardation can be canceled.

Under such a condition, however, the viewing angle characteristic is insufficient. So considering the improvement of the viewing angle characteristic, it is required that the twist angle is 10°–80° and the product Δn·d (μm) of the thickness d of the liquid crystal and the refractive index anisotropy Δn is smaller than 0.5 μm. If the twist angle is smaller than 90°, the alignment directions of the liquid crystal molecules at the substrate surface regions are not orthogonal with the driving voltage of 8 V and thus a minute retardation remains. So the high voltage of 20 V or more must be applied to obtain the high contrast of 100:1 or more.

Thus, if the birefringent medium made of e.g. polymer films having the retardation smaller than 0.05 μm corresponding to the remaining retardation in the liquid crystal layer is arranged between the liquid crystal layer and at least one of polarizers, the remaining retardation can be compensated for so that the display device can provide the high contrast of 100:1 or more with the low voltage of 8 V or so.

The birefringent medium used in the present invention may be made of transparent polymer films of triacetyl-cellulose, polycarbonate, polyvinylalcohol, polyethersulfon, polyethylene-telephtalate.

In order to compensate the retardation when a selective voltage or a high voltage is applied, the retardation in the above birefringent medium must range from 0.01 to 0.25 μm considering the characteristic shown in FIG. 4 and several other kinds of liquid crystal materials. Such retardation can be preferably obtained by using two or more polymer films. Stacking the polymer films with their slow axes in parallel to each other provides the sum of retardations in the respective films whereas stacking them with their slow axes orthogonal to each other provides a difference between the retardations in them. So the crossing angle must be selected in accordance with the compensation value to be given.

In the STN liquid crystal display device, when a non-selective voltage is applied, the spiral structure does not completely disappear so that the crossing angle in stacking the polymer films to compensate for the retardation should be smaller than 90°. In the case of the thin film transistor LCD, stacking the films orthogonally permits the polymer films themselves to improve the viewing angle characteristic.

There are two methods to compensate for the retardation remaining in the substrate surface regions. One is to stack two polymer films to cross the rubbing directions of the upper and lower substrates, respectively. The other is to stack one polymer film to cross the vector sum of the vectors representing rubbing directions of the upper and lower substrates.

If different kinds of polymer films, particularly the films having different wavelength dispersion characteristics in the refraction coefficient are stacked with their slow axes crossing each other, the compensation for the retardation remaining in the substrate surface regions can be controlled in accordance with the difference in the wavelength dispersion characteristics between the refractive indices in the respective films. In this case, if the wavelength dispersion characteristics of the refraction indices of the liquid crystal and the polymer films are set to be substantially equal, the retardation in the entire wavelength region of visible light can be canceled, thereby compensating for the retardation more completely. Thus, the contrast can be further improved. Incidentally, the kind of each polymer film may be selected in accordance with the object to be attained.

In the liquid crystal display device according to the present invention, the slow axis of the birefringent medium used is adapted to be substantially orthogonal to that of the liquid crystal layer used. The slow axis of the liquid crystal layer has a direction substantially equal to that of the vector sum of the rubbing directions on the surfaces of the upper and lower substrates sandwiching the liquid crystal layer.

Generally, in the liquid crystal display device, the polarizing film for the polarizer is sandwiched by protective films capable of interrupting water and ultra-violet rays. The protective films are made of the material having birefringence such as triathetyle-cellulose (TAC). The protective films and the polarizing film are stacked so that the slow axis of the former is in parallel or orthogonal to the absorption axis of the polarizing film, and the polarizer itself does not have a retardation. However, if the slow axis of the protective film kept in contact with the substrate and having a retardation of 0.01–0.25 μm is caused to cross the absorption axis of the polarizing film, the elliptical polarizer having a retardation can be obtained. Further, if the protective films of polymer are stuck onto the elliptical polarizer, the retardation and the wavelength dispersion characteristic of the refraction coefficient can be controlled.

The liquid crystal display device according to the present invention can be applied to the light source of a transmissive type using a cool fluorescent light, a hot fluorescent light and electroluminescence, and of a reflective type using external light.

The reason why the liquid crystal display device according to the present invention can provide high contrast and improved uniformity of display is that black display is provided when the liquid crystal molecules except those in the substrate surface regions rise substantially to stabilize the molecule alignment, thereby reducing attenuation in the transmission, and bright white display can be obtained by compensating for the residual retardation in the liquid crystal layer using a birefringent medium.

The reason why the viewing angle characteristic is excellent is that the twist angle is set for 10°–80° and the product Δn·d (μm) of the thickness d of the liquid crystal and the refractive index anisotropy Δn is set for the value smaller than 0.5 μm, and the birefringent medium for compensating for the retardation remaining in the substrate surface regions is arranged between the polarizer and the liquid crystal layer so that a change in the retardation due to the viewing angle can be reduced.

DESCRIPTION OF THE PREFERRED EMBODIMENTS

Figure 1:
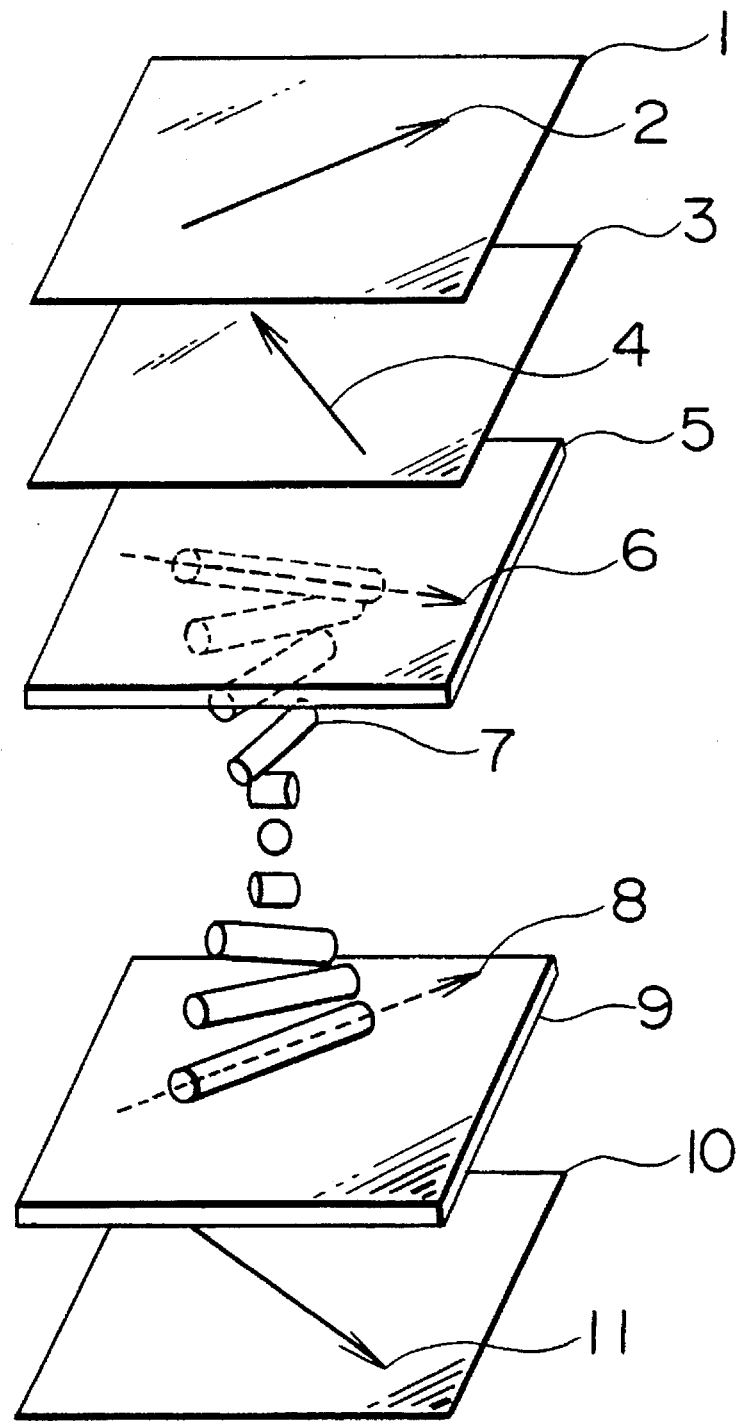
FIG. 1 is a schematic perspective view of the liquid crystal display device according to the present invention.

Now referring to the drawings, an explanation will be given of the present invention in connection with its several embodiments.

Embodiment 1

FIG. 1 schematically shows one embodiment of the liquid crystal display device according to the present invention. In this embodiment, using nematic liquid crystal having positive dielectric anisotropy as a field effect mode liquid crystal, multiplex driving is performed for the display device.

The twisting direction and angle of molecules in a liquid crystal layer 7 are defined by the rubbing direction 6 of an upper electrode substrate 5, rubbing direction 8 of a lower electrode substrate 9, and also defined by the kind and amount of chiral material doped into the nematic liquid crystal used. The twist angle is limited to 360° in its maximum value since the lighting or selection state in the neighborhood of the threshold value results in an alignment which is liable to scatter light, and limited to 180° by the contrast in its minimum value.

This embodiment intends to provide a liquid crystal display device which has electrodes formed in matrix form and can give monochromatic display with satisfactory contrast even when the number of scanning lines is 200 or more. For this reason, the twist angle is set for 240° between the upper and lower substrates. In order to realize this twist angle, the pre-tile angle formed by the substrate surfaces with the liquid crystal molecules must be set for 2° or more, and now set for 4°. Incidentally, a polyimide alignment film (RN422 available from NISSAN KAGAKU, Japan) is formed on the substrate surfaces.

The nematic liquid crystal (ZLI-4455 available from MERK, Germany) used as liquid crystal material has biphenyl series and ester-cyclohexane series as main components. The liquid crystal layer has the refractive index anisotropy of $\Delta n=0.12$ and a thickness of 6.5 μm. The liquid crystal used is doped with a chiral material (S811 available from MERK, Germany) by 0.7 weight %.

Polarizing plates 1 and 10 (polarizer) used are made of G1220DU (polarizing degree of 99.95%) available from NITTO DENKO, Japan. The angle formed by the absorption axis of a lower polarizer 10 with the rubbing axis of a lower electrode substrate 9 is desired to be in the range of 30°–60° or 120°–150°, and set for 135° in this embodiment. The crossing angle of the absorption axis 11 of the lower polarizer 10 and the absorption axis 2 is set for about 90°.

One sheet of triathetyl-cellulose (TAC) film as a birefringent medium 3 is located externally on the upper electrode substrate 5. It may be arranged between the upper electrode substrate 5 and the liquid crystal layer 7, or between the lower electrode substrate 9 and the liquid crystal layer 7. One or two sheets of the birefringent medium 3 (organic polymer film) may be arranged between the upper substrate 5 and the upper polarizer 1 or between the lower substrate 9 and the lower polarizer 10. Where two sheets of the birefringent medium are arranged on one side, the retardation in each film is desired to be smaller than where one sheet of the medium is arranged on one side.

The organic polymer film used as the birefringent medium should be limited to the TAC film, and may be a transparent birefringent plastic elastic film such as polycarbonate(PC), polyvinylalcohol(PVA), polyethersulfon(PES), polyethylene-telephtalate(PET).

Figure 5:
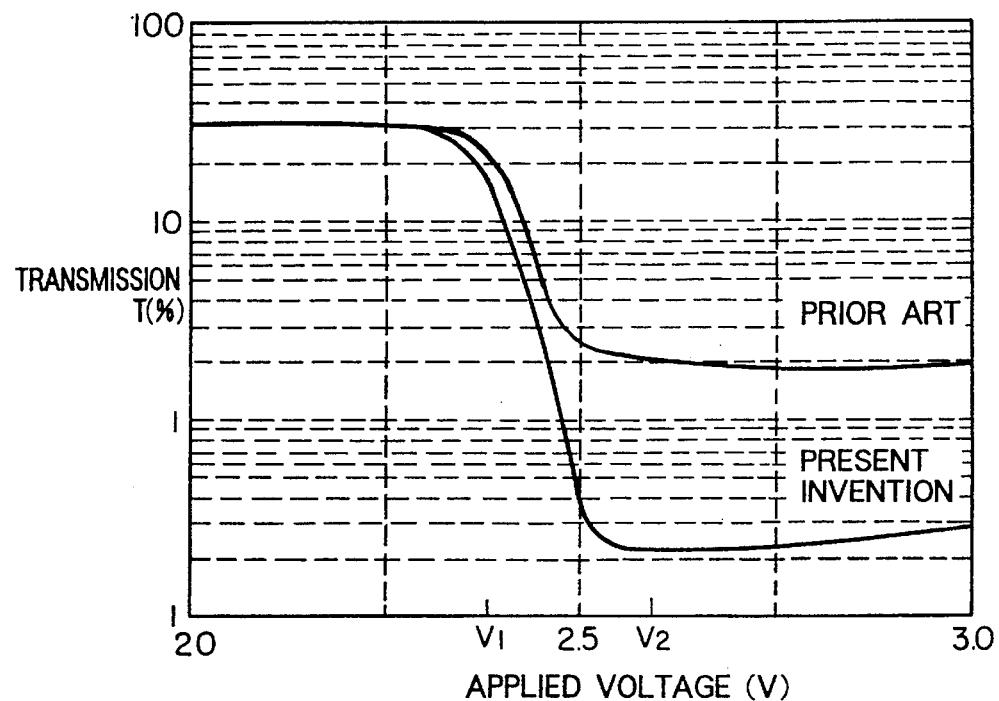
FIG. 5 is a graph showing the dependency of the transmission of the liquid crystal display element according to the present invention on an applied voltage.

FIG. 5 is a graph showing changes in the transmission for an applied voltage to the liquid crystal display device according to this embodiment. With the applied voltage of 2.6 V as a selective voltage $V_2$, the retardation was compensated for to minimize the transmission. Then, a non-selective voltage $V_1$ of 2.42 V was set for the 1/200 duty driving so as to provide two-value display. But, by setting an intermediate voltage $V_3$ of 2.5 V between $V_1$ and $V_2$ and a voltage of 2.8 V higher than $V_2$, three or more multi-gray scale display can be realized.

The retardation in the liquid crystal layer 7 is 0.78 μm when no voltage is applied, 0.70 μm when the non-selective voltage ($V_1$) of 2.42 V is applied, and 0.14 μm when the selective voltage ($V_2$) of 2.6 V is applied. Therefore, the retardation in the birefringent medium for compensating for the surface residual retardation in the liquid crystal layer must be 0.14 μm. If such birefringent medium is arranged, the transmission in black display becomes smaller than in the prior art as shown in FIG. 5 so that the contrast can be improved to 100:1 from 20:1 in the prior art.

The birefringent medium with the retardation of 0.14 μm can be provided by stacking TAC films having retardations of 0.3 μm and 0.44 μm with their slow axes caused to be orthogonal to each other, otherwise by stacking a TAC film having a retardation of 0.3 μm and a PVA film having a retardation of 0.16 μm at the wavelength of light of 0.55 μm.

Incidentally, the respective films have a positive wavelength scattering characteristic.

In order to obtain the contrast of 100:1 or more, the organic polymer film should have the retardation of 0.14 μm, but substantially the same effect can be obtained in the range of 0.14 μm±20%. Further, if the organic polymer having a retardation of 0.23 μm is used as it is, the contrast cannot reach 100:1 but is improved to 60:1.

Figure 6:
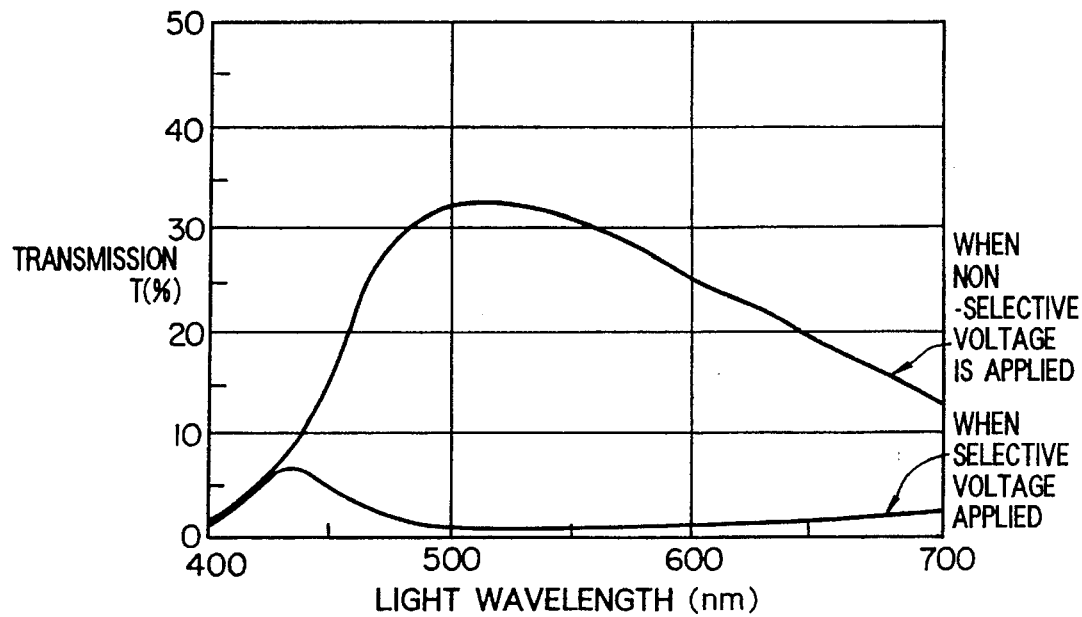
FIG. 6 is a graph showing the dependency of the transmission of the liquid crystal display element according to the present invention on the wavelength of light.

FIG. 6 is a graph showing dependency of the transmission on the wavelength of light when the selective and non-selective voltages are applied. As seen from the figure, when the selective voltage is applied to display black, the transmission is substantially zero. When the non-selective voltage is applied to display white, the transmission forms a curve with a peak of 550 nm. But this does not influence visual sensitivity. Thus, the dependency of the transmission on the wavelength is slight in a visible light range (400–700 nm). This leads to high-contrast and clear monochromatic display.

Figure 7:
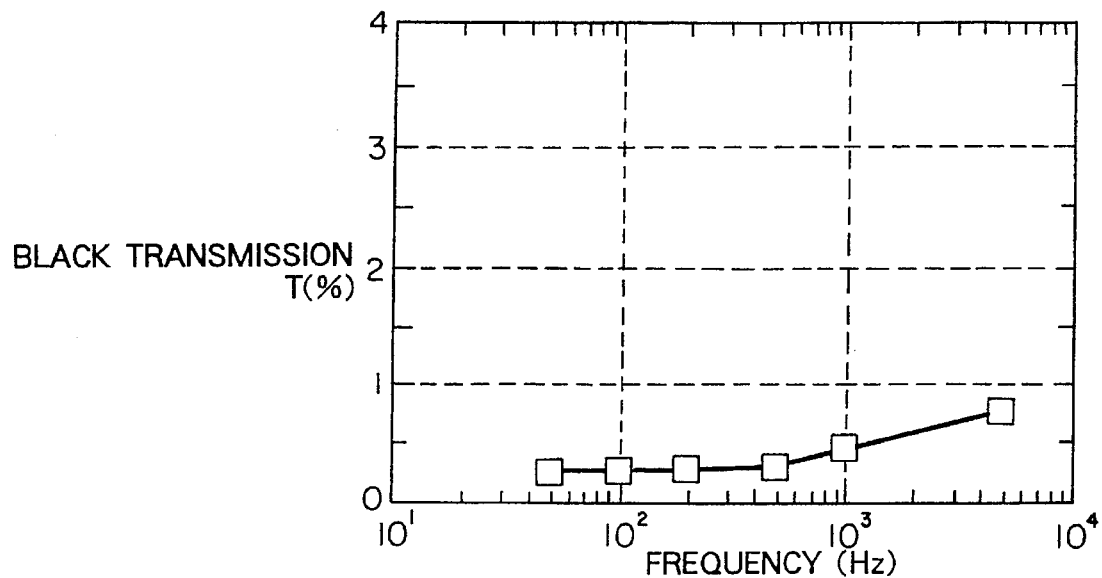
FIG. 7 is a graph showing the dependency of the transmission of the liquid crystal element according to the present invention when black is displayed on a frequency.
Figure 8:
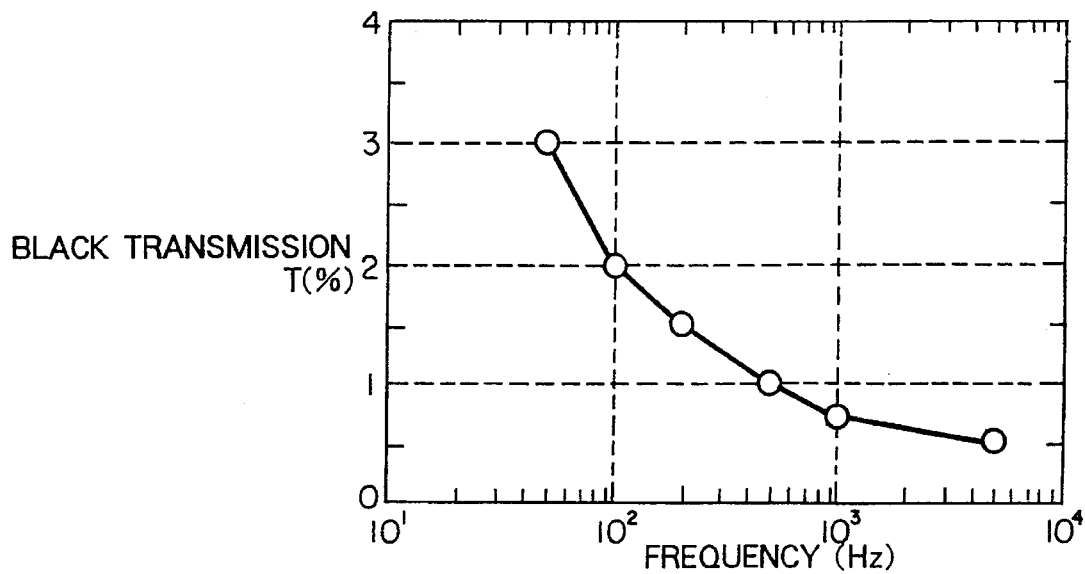
FIG. 8 is a graph showing the dependency of the transmission of the liquid crystal element according to the prior art when black is displayed on a frequency.

FIG. 7 is a graph showing the frequency dependency of the transmission when black is displayed in this embodiment. FIG. 8 is a graph showing the frequency dependency of the transmission when black is displayed in the prior art normally close system. The arrangement of the prior art providing the transmission as shown in FIG. 8 will be described below as a comparative example 1.

In this embodiment, the ratio of the transmission at the frequency of 50 Hz to that at 1 kHz is about 2.5 whereas it is about 4.9 in the prior art. This suggests that this embodiment gives less change in the transmission so that crosstalk is difficult to occur. It should be noted that the twist angle of the liquid crystal device being in the range of 180°–270° can provide the same effect relative to the crosstalk.

In this embodiment, a cool fluorescent light was used as a light source. But a hot fluorescent light or electroluminescence may be used. Without using any particular light source, external light may be used together with a reflection plate (reflection type). In the case of the reflection type, if a polarizer having high optical transmission, e.g. the polarizer having transmission of 40% or more and a polarizing degree of 95% (NPF-F1225DU having transmission of 40 or more available from NITTO DENKO, Japan), the brightness can be improved without reducing the contrast. Further, a color filter may be used to realize color display.

Comparative Example 1

Figure 2A:
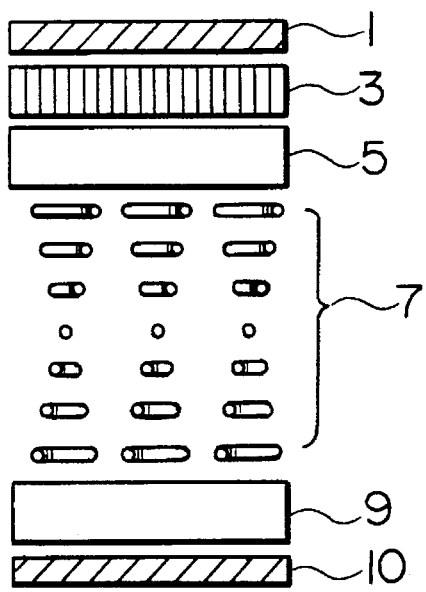
FIGS. 2A and 2B are schematic sectional views showing the alignment state of liquid crystal molecules in a liquid crystal display element.
Figure 2B:
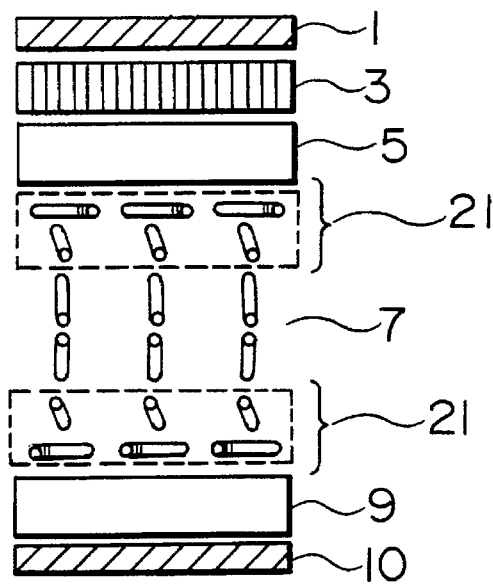
Figure 3:
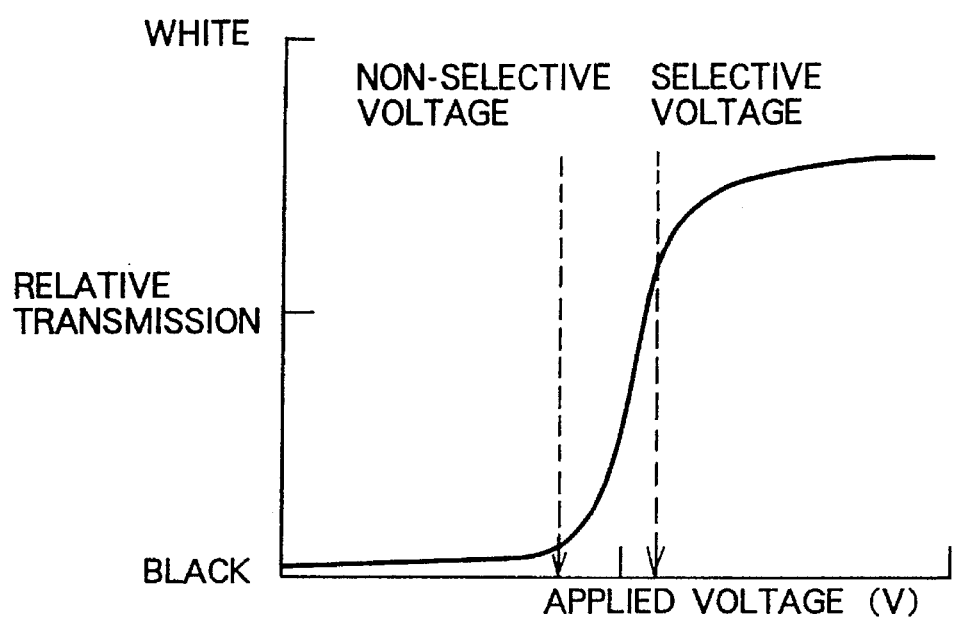
FIG. 3 is a graph showing the relationship between the transmission of the liquid crystal display element according to the prior art and an applied voltage.
Figure 4:
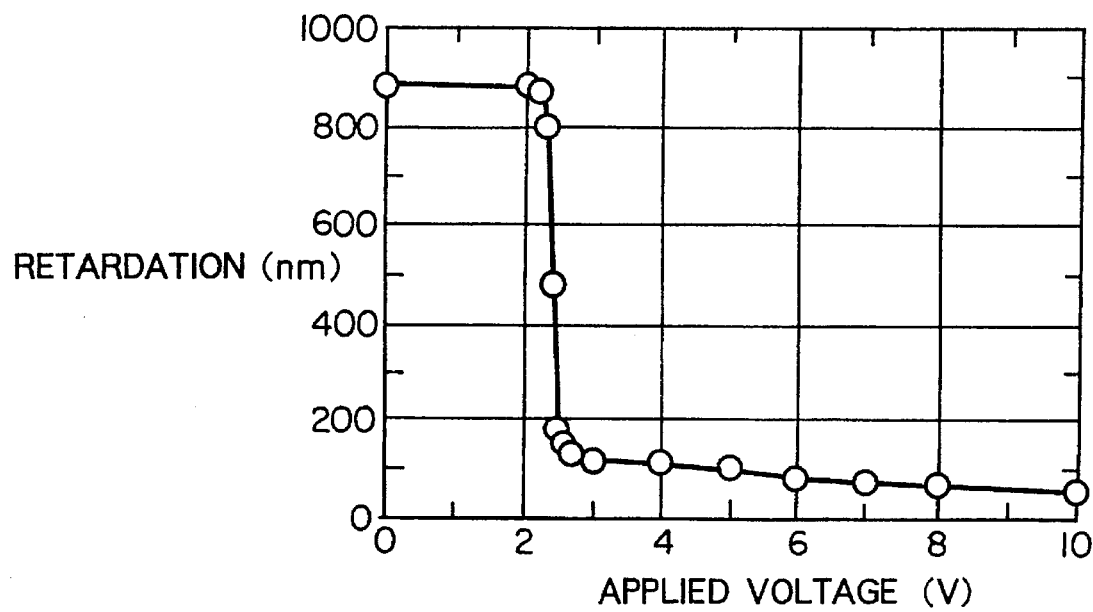
FIG. 4 is a graph showing the dependency of the retardation in the liquid crystal display element according to the present invention on an applied voltage.

It is an arrangement in which color correction is performed in the state of FIG. 2A. In this arrangement, the liquid crystal display device having a twisted liquid crystal layer is further stacked in place of the polymer film used as the birefringent medium 3 in this embodiment. The twist angle of the newly stacked liquid crystal display device is set for −240° contrary to this embodiment. No voltage is applied to this device. This arrangement is a normally close system in which black is displayed when no voltage is applied. This arrangement provides contrast of 20:1. As seen from FIG. 8, the transmission when black is displayed changes greatly so that crosstalk is liable to generate.

Comparative Example 2

In the same arrangement as this embodiment, for color correction, the birefringent medium having a large retardation is used for color correction. The angle formed by the absorption axis 11 of the lower polarizer 10 with the rubbing axis of the lower electrode substrate 9 is set for 45°, and the crossing angle of the absorption axis 11 and the absorption axis 2 of the upper polarizer is set for about 90°. One sheet of PC film having a retardation of 0.56 μm is used, and the angle formed by the slow axis 4 of the film with the rubbing axis 6 of the upper electrode substrate 5 is set for about 90°. Such an arrangement is a normally open system in which white is displayed when no voltage is applied or the non-selective voltage is applied. This arrangement, in which the birefringent medium is arranged giving precedence to the white display and transmission, provides contrast of about 4:1.

Embodiment 2

This embodiment has the same arrangement as Embodiment 1, but a different material for the birefringent medium from that in Embodiment 1. Specifically, in this embodiment, as the birefringent medium, a PC film having a retardation of 0.2 μm and another PC film having a retardation of 0.34 μm are stacked with their slow axes caused to be orthogonal to each other thereby to provide a retardation of 0.14 μm. Thus, this embodiment provides contrast of 70:1.

Embodiment 3

This embodiment has the same basic arrangement as Embodiment 1. As the birefringent medium 3, a PC film having a thickness of 100 μm, refractive index anisotropy Δn of 0.0014 and retardation of 0.14 μm. Further, a PC film having a thickness of 50 μm and retardation of 0.56 μm is arranged as a birefringent medium between the lower polarizer 10 and the lower electrode substrate 9. Thus, this embodiment provides contrast of 70:1.

Embodiment 4

In this embodiment, a liquid crystal element is used as the birefringent medium 3. The liquid crystal element is doped with a chiral material (R811 available from MERK) by 0.5 weight %, and has a twist angle of −240° and Δn·d=0.99 μm. A square wave having an effective value of 4 V is applied to the liquid crystal element. The retardation in the liquid crystal element when the voltage is applied to it is 0.14 μm. Thus, this embodiment provides contrast of 100:1.

Embodiment 5

Figure 9:
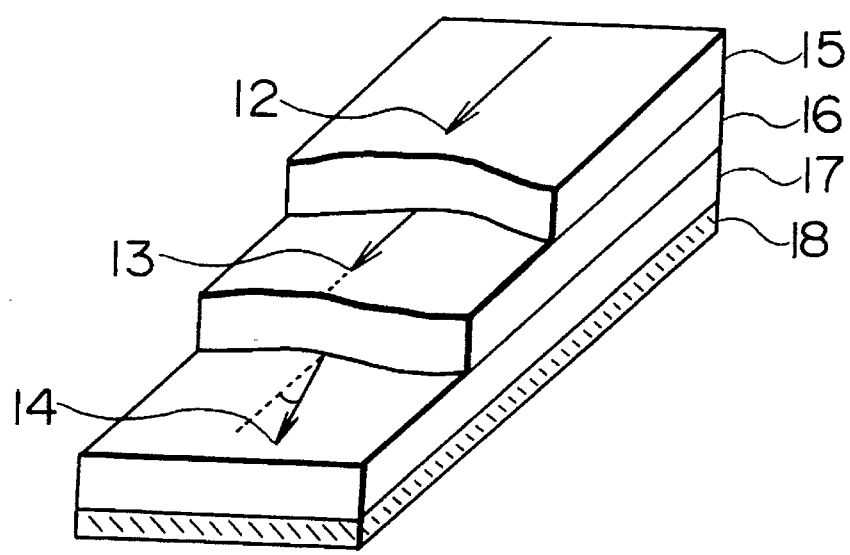
FIG. 9 is a perspective view of the elliptical polarizer according to one embodiment of the present invention.

In this embodiment, an elliptical polarizing plate integrated with the polarizer is used as the birefringent medium 3. FIG. 9 is a perspective view of the polarizing plate used in this embodiment. A polarizing film 16 is stacked on both sides with protective films 15 and 17 which are organic polymer films. These protective films serve to interrupt water and ultra-violet rays.

The polarizing plate 16 is a polyvinyl-alcohol (PVA) doped with iodine with its one axis extended. The protective films 15 are TAC films having a retardation of 0.050 μm. The crossing angle of the slow axis 14 and the absorption axis 13 of the polarizing film 16 is set for 15°.

Figure 10A:
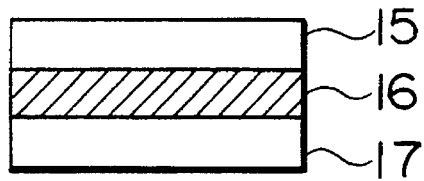
FIGS. 10A and 10B are sectional views of the elliptical polarizer according to other embodiments of the present invention.
Figure 10B:
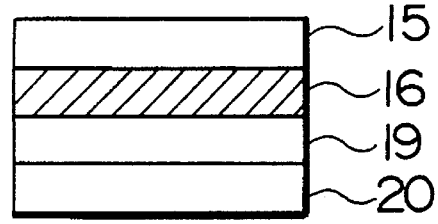

Incidentally, an adhesive layer 18 may be attached to the outside of the protective film 17 so as to be kept in intimate contact with the substrate of the liquid crystal element. The protective films may also be a birefringent plastic drawn film such as polycarbonate and polyvinyl alcohol. The elliptical polarizing plate integrated with the birefringent medium may have the sectional structure composed of three and four or more layers as shown in FIGS. 10A and 10B.

Embodiment 6

This embodiment has the same basic arrangement as Embodiment 1. In this embodiment, the crossing angle of the absorption axis 11 of the lower polarizer 11 and the absorption axis 2 of the upper polarizer 1 is set for about 90°. The twist angle of the liquid crystal layer is set for 60° and the angles formed by the absorption axes 4, 11 with the rubbing axes 6, 8 are set for 15°, respectively. ZLI1800-100 ($\Delta n=0.0705$) which is available from MERK is used as a liquid crystal material. The thickness d of the liquid crystal layer is set for 4.9 µm and $\Delta n \cdot d$ thereof is set for 0.345 pm. The birefringent medium 3 is composed of two sheets of PVA one axis extending film having a retardation $\Delta n d$ of 0.03 µm. One sheet is arranged between the lower polarizer 10 and the lower substrate 9 and the other is arranged between the lower polarizer 1 and the upper substrate 5. The slow axis 4 of the film is set for 90° with the rubbing axes 6 and 8 in the substrate surfaces. The angles formed by the absorption axes 4, 11 with the rubbing axes 6 and 8 is set for 15°, respectively, but should not be limited to 15°.

Thus, the transmission at the front is 37.6% (when 0 V is applied) and the contrast when 8 V is applied is about 220:1.

When the gray scale level of brightness at the front is divided into eight stages and the regions when each gradation is displayed are viewed from a tilting direction, the angle range when light and shade start to turn over first in two adjacent regions is 72° in the horizontal direction and 55° in the vertical direction.

The angles formed by the absorption axes 2 and 11 of the polarizers 1 and 9 are ideally 90°. But when this angle is in the range of 80°–100° and the angles formed by the slow axis 4 of the birefringent medium 3 with the rubbing axes 6 and 8 is in the range of 60°–120°, substantially the same contrast as in this embodiment can be obtained and the display characteristic such as a viewing angle characteristic can be improved. Further, when the retardation $\Delta n \cdot d$ in the liquid crystal layer 7 is in the range of 0.26–0.45 µm, the transmission not less than 90% of that at $\Delta n \cdot d = 0.345$ µm can be attained so as to provide bright display.

Embodiment 7

The basic arrangement is the same as in Embodiment 6. In this embodiment, only one sheet of the birefringent medium 3 is used. ZLI1646 ($\Delta n=0.08$) available from MERK is used as liquid crystal material. The thickness d of the liquid crystal layer is set for 4.3 µm and $\Delta n \cdot d$ is set for 0.34 µm. As the birefringent medium 3, a one-axis extending film (polymer film) with $\Delta n \cdot d$ of 0.03 µm is arranged between the upper polarizer 1 and the substrate 5 in such a manner that its slow axis 4 is substantially orthogonal to the direction of the vector sum of the rubbing directions in the substrate surface. In this case, the birefringent medium 3 may be arranged between the lower polarizer 11 and the substrate 10.

Thus, the transmission at the front is 37.4% (when 0 V is applied) and the contrast when 8 V is applied is about 210:1.

When the gray scale level of brightness at the front is divided into eight stages and the regions when each gray scale level is displayed are viewed from a tilting direction, the angle range when light and shade start to turn over first in two adjacent regions is 32.5° in both left and right sides respectively with respect to the normal line and 20° in both upper and lower sides respectively with respect to the normal line.

The angle formed by the absorption axis of the polarizer 2 is ideally 90°. But when this angle is in the range of 80°–100° and the angles formed by the slow axis 4 of the birefringent medium 3 with the rubbing axis 6 is in the range of 60°–120°, substantially the same contrast as in this embodiment can be obtained and the display characteristic such as a viewing angle characteristic can be improved. Further, when the retardation in the liquid crystal layer 7 is in the range of 0.26–0.45 µm, the transmission not less than 90% of that at $\Delta n \cdot d=0.34$ µm can be attained so as to provide bright display.

Embodiment 8

The basic arrangement is the same as in Embodiment 6. In this embodiment, two sheets of the birefringent medium 3 are used. The crossing angle of the absorption angle 11 of the lower polarizer 10 and the absorption axis 2 of the upper polarizer 1 is set for about 90°, and the twist angle of the liquid crystal layer is set for 60°. ZLI1646 ($\Delta n=0.08$) available from MERK is used as liquid crystal material. The thickness d of the liquid crystal layer is set for 4.6 µm and $\Delta n \cdot d$ is set for 0.37 µm. The birefringent medium 3 is prepared by stacking two one-axis extending PC films having $\Delta n \cdot d$ of 0.58 µm and 0.54 µm with their extending directions orthogonal to each other. Those films have a slow axis in the extending direction of the film having larger retardation and can be dealt with as a single birefringent medium having the retardation of 0.04 µm. Such refringent media are arranged between the substrates 5, 9 and polarizers 1, 10, respectively in such a manner that their slow axes form 90° with the corresponding rubbing axes 6 and 8.

Figure 11:
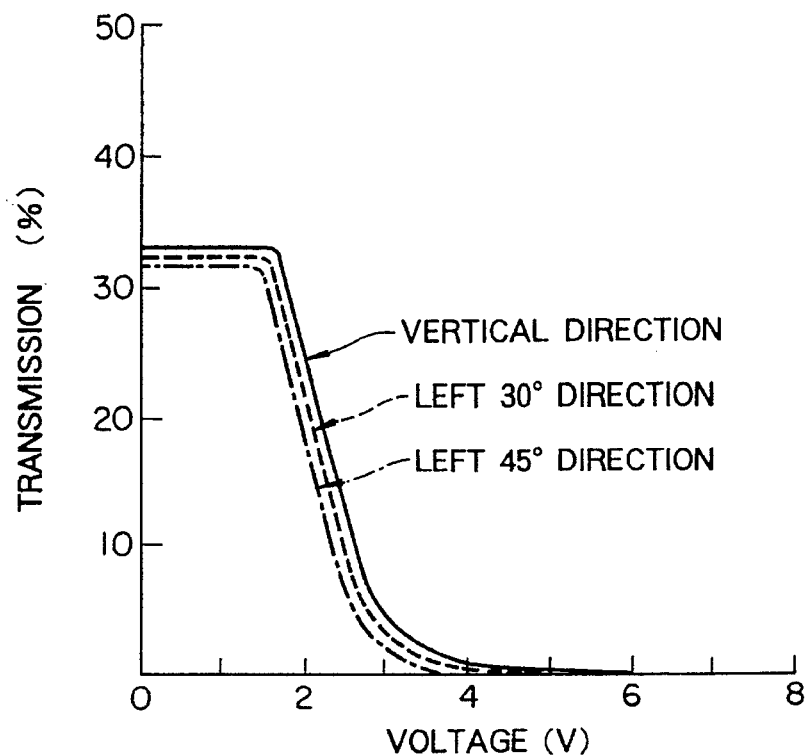
FIGS. 11 is a graph showing the viewing angle characteristic of the liquid crystal display element according to one embodiment of the present invention.

FIG. 11 is a graph showing the relationship between transmission and an applied voltage measured in the direction perpendicular to the surface of the substrate 1 and tilted by 30° and 45° from the substrate surface on its left side. The transmission (%) is represented by the ratio of the luminance of a light source to that after the light passes through the display device. The transmission is measured by a luminance meter (type 1980A) which is available from PHOTO RESEARCH CORPORATION.

The parallel transmission only through the polarizer is 34%, and the transmission in the vertical direction when the voltage of 1 V is applied is 31%. The contrast when 6 V is applied is 160:1. As seen from FIG. 11, the tilted transmission at 30° and 45° on the left side is only slightly different from that in the vertical direction.

In the conventional twisted nematic mode in which the twist angle of the liquid crystal layer is 90°, the light and shade turns over when the viewing angle is increased. In this embodiment, such a thing does not occur.

The angles formed by the absorption axes 2 and 11 of the polarizers 1 and 9 are ideally 90°. But when this angle is in the range of 80°–100° and the angles formed by the slow axis 4 of the birefringent medium 3 with the rubbing axes 6 and 8 is in the range of 60°–120°, substantially the same contrast as in this embodiment can be obtained and the display characteristic such as a viewing angle characteristic can be improved. Further, when the retardation $\Delta n \cdot d$ in the liquid crystal layer 7 is in the range of 0.26–0.45 µm, the transmission not less than 90% of that at $\Delta n \cdot d=0.345$ µm can be attained so as to provide bright display.

Embodiment 9

In this embodiment, its basic arrangement is the same as in Embodiment 7. The twist angle of the liquid crystal layer is set for 75°, the crossing angle of the absorption axis 11 of the lower polarizer 10 with the absorption axis 2 of the upper polarizer 1 is set for about 90°, and the angle formed by the absorption axis of the lower polarizer 10 with the rubbing axis 8 is set for about 12.5°, but should not be limited to this angle. The thickness of the liquid crystal layer is set for 5.1 μm and Δn·d thereof is set for 0.41 μm. The birefringent medium 3 is not arranged between the substrate 5 and the polarizer 1, but in place of this, the elliptical polarizer having the protective film with Δn·d of 0.41 μm shown in FIG. 9 is used. The slow axis of the protective film 17 is adapted to be orthogonal to the rubbing directions 6, 8 for the surfaces of the substrates 5, 9.

The parallel transmission only through the polarizer is 34%, and the transmission in the vertical direction when the voltage of 1 V is applied is 33%. The transmission can be improved as compared with the case of Embodiment 8 in which the birefringent medium 3 is used individually from the polarizer. The thickness itself of the liquid crystal display device can be decreased by about 5%.

The angles formed by the absorption axes of the polarizers 2 and 11 are ideally 90°. But when this angle is in the range of 80°–100° and the angles formed by the slow axis 4 of the birefringent medium 3 with the rubbing axes 6 and 8 is in the range of 60°–120°, substantially the same contrast as in this embodiment can be obtained and the display characteristic such as a viewing angle characteristic can be improved. Further, when the retardation Δn·d in the liquid crystal layer 7 is in the range of 0.26–0.45 μm, the transmission not less than 90% of that at Δn·d=0.345 μm can be attained so as to provide bright display.

Comparative Example 3

Figure 12:
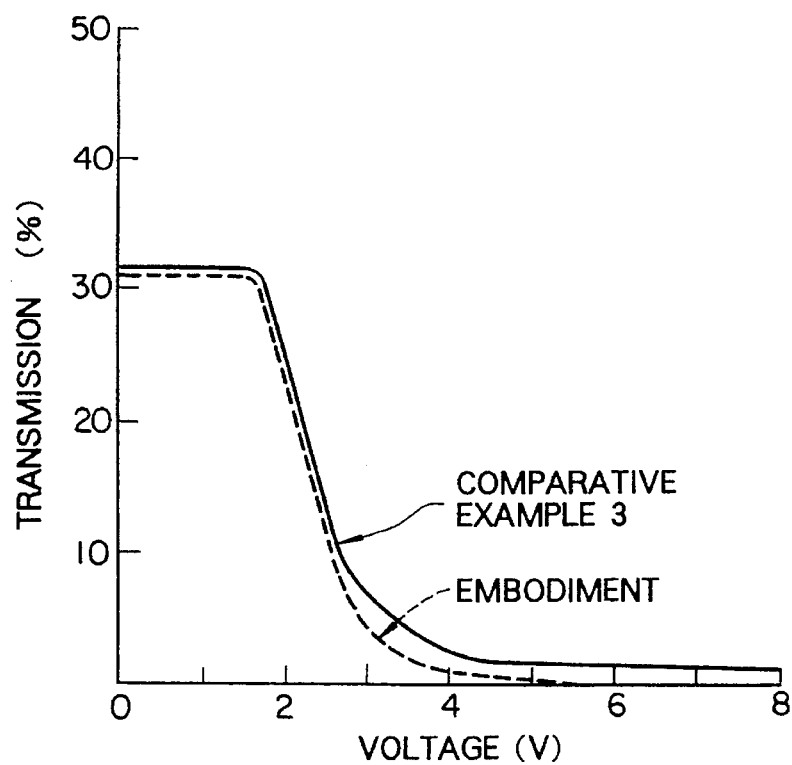
FIG. 12 is a graph showing comparison in the viewing angle characteristics in liquid crystal display elements.

FIG. 12 is a graph showing the relationship between the transmission and an applied voltage where the birefringent medium 3 is not inserted in the display device according to Embodiment 8. In Embodiment 8, the contrast of 160:1 was obtained when 6 V is applied. In this comparative example, the contrast obtained was 30:1. Reduction in the contrast is due to the retardation in the liquid crystal in the neighborhood of the alignment film.

In the liquid crystal display device according to Embodiments 6–9, examples of the twist angle of the liquid crystal and of the retardation Δn·d are described.

Figure 13:
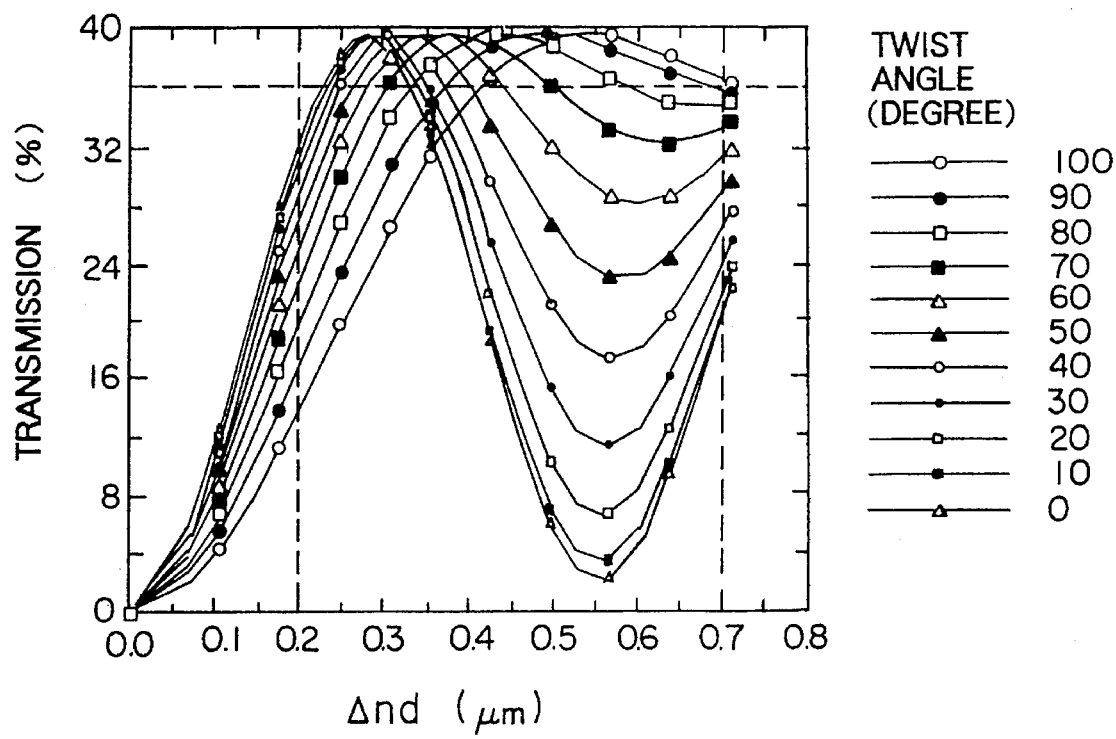
FIG. 13 is a graph showing the relationship between the twist angle 8 of a liquid crystal layer, and the transmission and liquid crystal retardation.

FIG. 13 shows the relationship between the transmission and the retardation Δn·d taking the twist angle as a parameter when no voltage is applied. FIG. 13 shows the characteristic when the birefringent medium 3 is not inserted. As seen form FIG. 13, by setting the retardation Δn·d in the range of 0.2–0.7 μm, the characteristic of 90% or more of the maximum transmission can be obtained.

Figure 14:
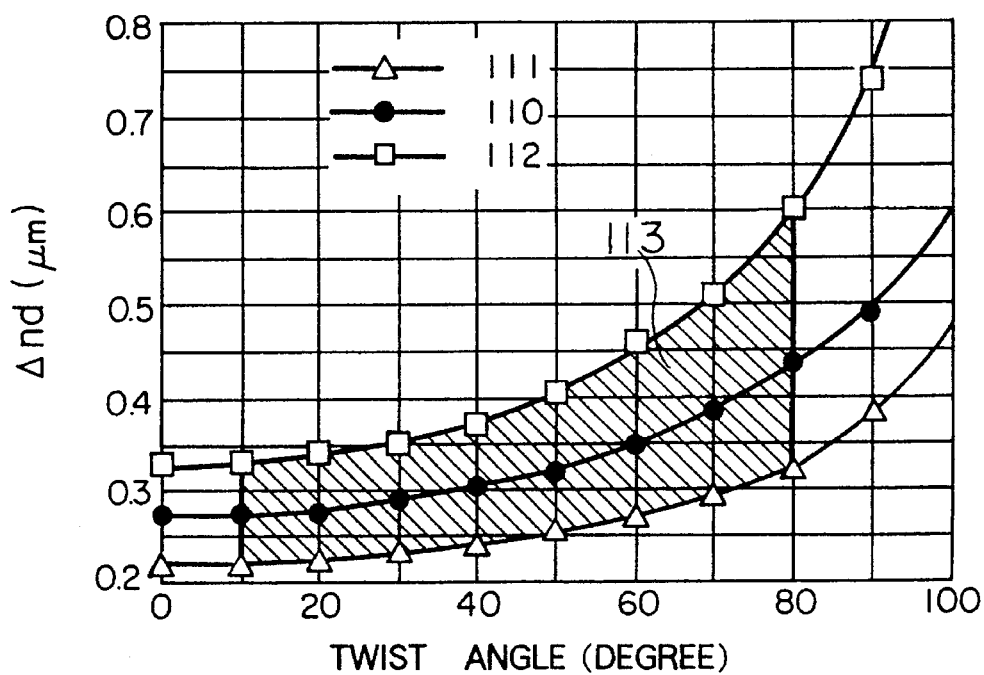
FIG. 14 is a graph showing the relationship between the twist angle 8 of a liquid crystal layer and the retardation providing the maximum transmission and 90% transmission.

FIG. 14 shows the relationship between the twist angle which is changed from 0° to 90° and the retardation Δn·d (μm) at the maximum transmission when the birefringent medium 3 is not inserted. The relationship between the retardation Δn·d in the liquid crystal layer and the twist angle which permits the viewing angle to be enlarged without reducing the transmission at the front at the threshold voltage or lower provides a curve 110. The curve 110 can be represented by $$\Delta n \cdot d = 0.287 - 4.96 \times 10^{-4}\theta - 3.05 \times 10^{-5}\theta^2 \quad (1)$$

Further, in FIG. 14, measuring the transmission (about 90% of the maximum transmission) providing negligible reduction of the brightness provides the relationship between the twist angle and retardation Δn·d represented by curves 111 and 112. The region 113 surrounded by the curves 111 and 112 can be expressed by $$0.2238 - 5.55 \times 10^{-4}\theta + 2.43 \times 10^{-5}\theta^2 \leq \Delta n \cdot d \leq 0.333 - 1.21 \times 10^{-3}\theta \\ + 5.63 \times 10^{-5}\theta^2 \quad (2)$$

(where $10 \leq \theta \leq 80$)

By simplifying Equation (2), the range of the retardation Δn·d in the liquid crystal layer can be represented as $(0.033 \times \theta + 0.1)^{18}(0.033 \times \theta + 0.3)$ μm.

Figure 15:
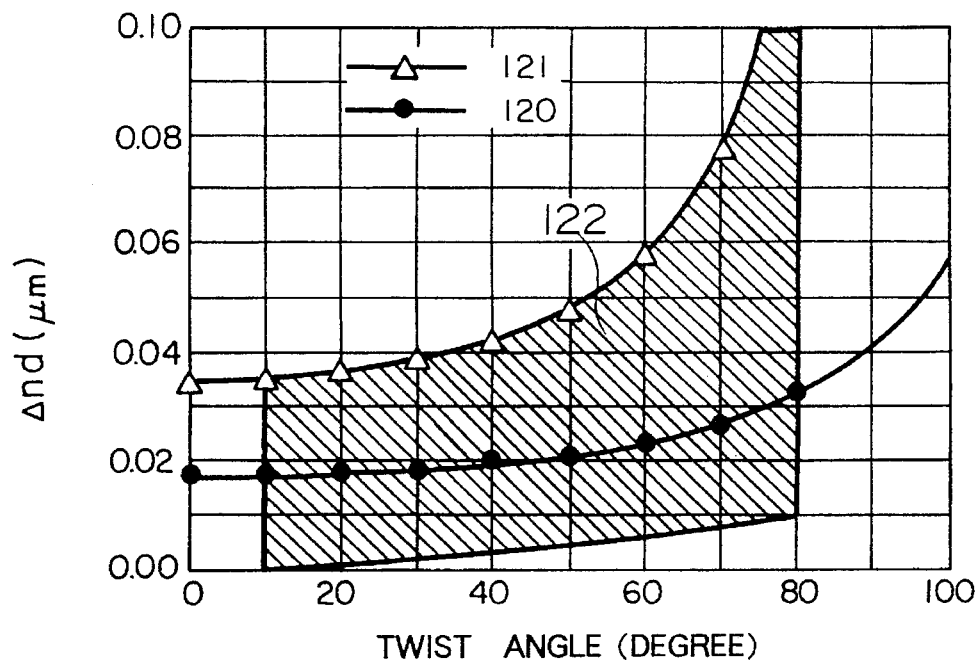
FIG. 15 is a graph showing the twist angle of a liquid crystal layer and the retardation in a birefringent medium.

When the twist angle is changed with the voltage of 8 V applied to the liquid crystal layer 7 in a state where the slow axis 4 of the birefringent medium 3 composed of two polymer films is orthogonal to the rubbing directions 6 and 8 of the substrates 5 and 9, the retardation Δn·d for each film which reduces the transmission most greatly, i.e. provides the highest contrast can be evaluated as a curve 120 as shown in FIG. 15.

The curve 120 can be expressed by $$\Delta n \cdot d = 0.0175 + 8.57 \times 10^{-5}\theta - 3.07 \times 10^{-6}\theta^2 + 5.30 \times 10^{-8}\theta^3 \quad (3)$$

Limiting the range of Δn·d in the region where the contrast at the front is higher than where the birefringent medium 3 is not inserted provides higher display quality. Measuring the range provides a shaded portion 122 of FIG. 16. The shaded portion can be represented by $$-1.16 \times 10^{-3} + 1.05 \times 10^{-4}\theta + 4.46 \times 10^{-7}\theta^2 \leq \quad (4)$$

$$\Delta n \cdot d \leq 0.347 + 2.93 \times 10^{-4}\theta - 1.30 \times 10^{-5}\theta^2 + 2.51 \times 10^{-7}\theta^3$$

(where $10 \leq \theta \leq 80$)

By simplifying Equation (4), the range of the retardation Δn·d for one sheet of the birefringent medium can be represented as $(0.00025 \times \theta - 0.1)^{-}(0.00025 \times \theta + 0.3)$ μm.

Figure 16:
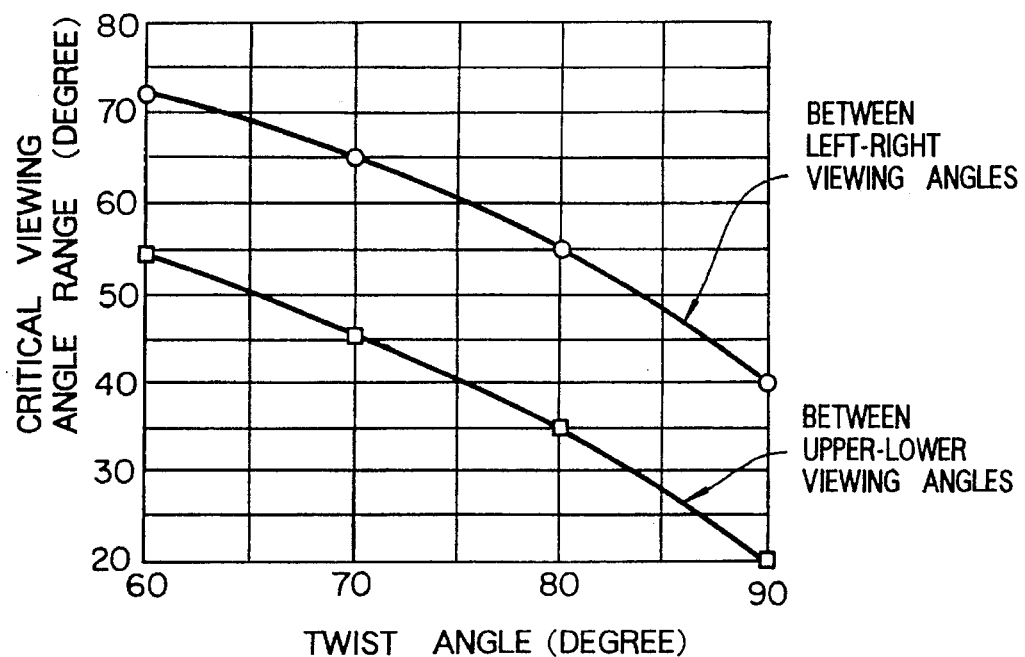
FIG. 16 is a graph showing the relationship between the twist angle of a liquid crystal layer and a non-inverting viewing angle range.

In the range of the twist angle 60°–90°, the viewing angle characteristic of the liquid crystal display device which satisfies the curve 110 in FIG. 14 and the curve 120 in FIG. 15 gives an improved measurement result as shown in FIG. 16. Therefore, if the liquid crystal layer satisfying the shaded portion 113 in FIG. 15 and two sheets of the birefringent medium 3 satisfying the shaded portion 122 in FIG. 15 are used, the liquid crystal display device which can provide the contrast of 100:1 and the improved viewing angle characteristic can be realized.

Figure 17:
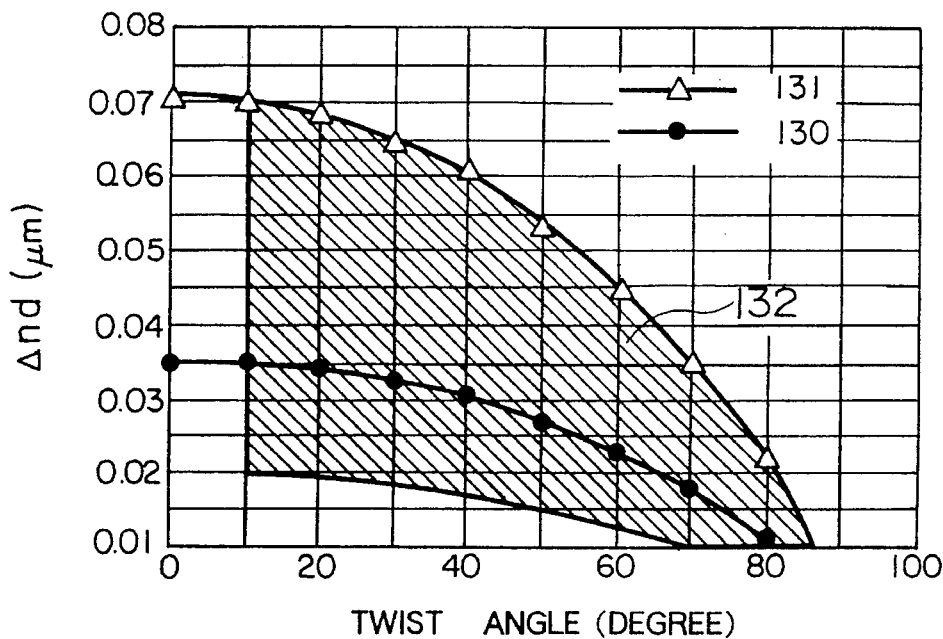
FIG. 17 is a graph showing the relationship between the twisted angle of a liquid crystal layer and the retardation in a birefringent medium.

It is assumed that the voltage of 8 V is applied to the liquid crystal layer 7 when the slow axis of one sheet of the birefringent medium 3 perpendicular to the direction of the vector sum of the rubbing axes 6 and 8 of the upper and lower substrates 5 and 9 is arranged between the substrate 5 and the rubbing axis 8 or between the substrate 9 and the rubbing axis 8. In this state, measuring the twist-angle dependency of the retardation Δn·d for each sheet of the birefringent medium 3 reducing the transmission most greatly provides a curve 130 as shown in FIG. 17. The curve 130 can be expressed by $$\Delta n \cdot d = 0.0357 - 7.44 \times 10^{-5}\theta + 3.80 \times 10^{-7}\theta^2 - 4.32 \times 10^{-8}\theta^3 \quad (5)$$

Limiting the range of Δn·d in the region where the contrast at the front is higher than the conventional level where the birefringent medium 3 is not inserted provides higher display quality. Measuring the range provides a shaded portion 132 of FIG. 17. The shaded portion can be represented by $$0.0203 - 8.21 \times 10^{-6}\theta - 1.96 \times 10^{-6}\theta^2 \leq \quad (6)$$

$$\Delta n \cdot d \leq 0.0707 - 1.46 \times 10^{-5}\theta - 1.67 \times 10^{-6}\theta^2 + 2.61 \times 10^{-8}\theta^3$$

(where $10 \leq \theta \leq 80$)

By simplifying Equation (6), the range of the retardation Δn·d in the birefringent medium can be represented as $(0.00016 \times \theta - 0.025)^{-}(-0.0007 \times \theta + 0.09)$ μm.

Figure 18:
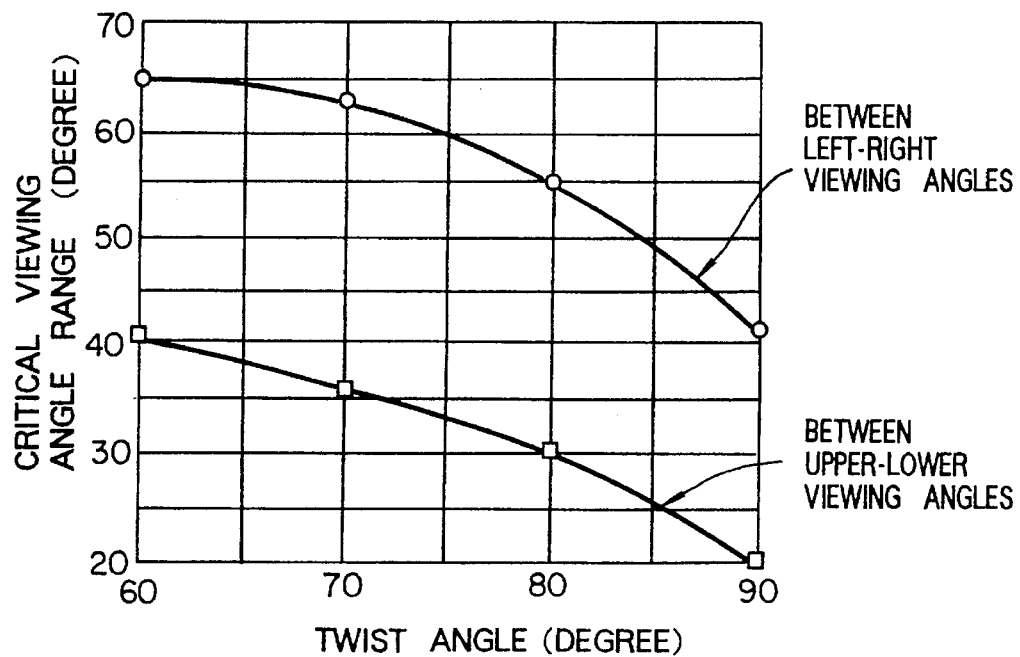
FIG. 18 is a graph showing the relationship between the twist angle of a liquid crystal layer and a non-inverting viewing angle range.

In the range of the twist angle 60°–90°, the viewing angle characteristic of the liquid crystal display device which satisfies the curve 110 in FIG. 14 and the curve 132 in FIG. 17 gives an improved measurement result as shown in FIG. 18. Therefore, if the liquid crystal layer satisfying the shaded portion 113 in FIG. 14 and the birefringent medium 3 satisfying the shaded portion 132 in FIG. 16 are used, the liquid crystal display device which can provide the improved contrast and viewing angle characteristic can be realized.

The above embodiments 7–9 and the evaluation in FIGS. 15–18 are optimized by maximizing the transmission at 0 V and minimizing that at 8 V. Considering that the driving voltage is relatively low, when an optimum birefringent medium 3 is inserted so as to minimize the transmission at e.g. 5 V, the retardation $\Delta n \cdot d$ in the birefringent medium 3 is made wider than the shaded portion 122 in FIG. 15 and the shaded portion 132 in FIG. 17 to provide the retardation $\Delta n \cdot d$ of 0.0005–0.2 μm. Further, the retardation $\Delta n \cdot d$ in the liquid crystal layer changes that in the birefringent medium 3 for compensating for the retardation remaining in the substrate surface. Therefore, in order to obtain the contrast of 100:1 or more by increasing the transmission at a voltage lower than the threshold voltage to 90% of the maximum transmission and decreasing that at a voltage higher than the threshold voltage, and to obtain a wider viewing angle characteristic than the conventional 90° twisted liquid crystal device, the retardation $\Delta n \cdot d$ in the birefringent medium 3 must be in the range of 0.005–0.2 μm with the twist angle of the liquid crystal layer of 10°–80°.

We claim:

1. A liquid crystal display device comprising:
    (a) a pair of substrates each having an electrode arranged oppositely to each other, at least one of them being transparent;
    (b) a liquid crystal layer arranged between said substrates;
    (c) a pair of polarizers arranged so as to sandwich said liquid crystal layer, each of said polarizers including a polarizing film for absorbing prescribed polarized light and birefringent transparent protective films sandwiching said polarizing film to be stacked on the polarizing film in intimate contact therewith, the slow axes of said protective films cross an absorption axis of said polarizing film, and the retardation in all of said protective films is in a range of 0.005–0.25 μm; and
    (d) control means for changing transmission of said liquid crystal layer by applying voltages of two or more values between said electrodes.

2. A liquid crystal display device according to claim 1, wherein each of said protective films includes two or more transparent organic polymer films, and retardations in at least two films of said organic polymer films are different, and a difference in the retardation between said films is smaller than that in each individual film.

3. A liquid crystal display device according to claim 2, wherein at least two films of said organic polymer films has a positive dispersion characteristic in which wavelength dispersion in birefringent retardation is different from the absolute value of retardation at a wavelength of 0.55 μm.

4. An elliptical polarizer for use in a liquid crystal display device comprising:
    a polarizing film for absorbing prescribed polarized light; and
    birefringent transparent protective films sandwiching said polarizing film to be stacked on the polarizing film in intimate contact therewith, the slow axes of said protective films cross an absorption axis of said polarizing film, and the total retardation in all of said protective films is in a range of 0.005–0.25 μm.

5. A liquid crystal display device, comprising:
    (a) a pair of substrates having electrodes;
    (b) a liquid crystal layer having a Spiral structure, arranged between said substrates;
    (c) a pair of polarizers arranged so as to sandwich said liquid crystal layer;
    (d) a birefringent medium arranged between said liquid crystal layer and one of said polarizers; and
    (e) structure for applying voltage to said electrodes,
    wherein retardation in said birefringent medium is set to be substantially equal to residual retardation due to the liquid crystal molecules at boundary regions upon application of the voltage to the liquid crystal layer.

6. A liquid crystal display device according to claim 5, wherein said birefringent medium has a retardation of 0.01–0.2 μm.

7. In a liquid crystal display device comprising
    (a) a pair of substrates each having an electrode;
    (b) a liquid crystal layer arranged between said substrates;
    (c) a pair of polarizers; and
    (d) control structure for changing transmission of said liquid crystal layer by applying voltages of two or more values between said electrodes,
    wherein each of said polarizers includes a polarizing film and birefringent transparent protective films sandwiching said polarizing film, and the total retardation in all of said protective films is in a range of 0.005–0.25 μm.

8. A liquid crystal display device, comprising:
    (a) a pair of substrates each having an electrode arranged oppositely to each other, at least one of them being transparent;
    (b) a liquid crystal layer having a spiral structure, arranged between said substrates;
    (c) a pair of polarizers arranged so as to sandwich said liquid crystal layer;
    (d) a birefringent medium arranged between said liquid crystal layer and at least one of said polarizers, retardation in said birefringent medium being equal or close to residual retardation due to the liquid crystal molecules at boundary regions, the retardation in the birefringent medium being 0.01–0.15 μm, and the slow axis of said birefringent medium being set for an angle to compensate for said residual retardation; and
    (e) control structure for changing transmission of said liquid crystal layer by applying voltages of two or more values between said electrodes.

9. A liquid crystal display device comprising:
    (a) a pair of substrates each having an electrode arranged oppositely to each other, at least one of them being transparent;
    (b) a liquid crystal layer arranged between said substrates, the liquid crystal layer having a spiral structure;
    (c) a pair of polarizers arranged so as to sandwich said liquid crystal layer;
    (d) a birefringent medium arranged between said liquid crystal layer and at least one of said polarizers, retardation in said birefringent medium being equal or close to residual retardation due to the liquid crystal molecules at boundary regions, and the slow axis of said birefringent medium being set for an angle to compensate for said residual retardation and wherein said liquid crystal layer has a twist angle of 10–80° and refractive index anisotropy Δn of 0.02–0.2, a product Δn·d of the thickness (μm) of said liquid crystal layer and said refractive index anisotropy is 0.2–0.7 μm, retardation in said birefringent medium is 0.005–0.2 μm, and the slow axis of said birefringent medium crosses a rubbing axis of at least one of said boundary regions; and (e) control structure for changing transmission of said liquid crystal layer by applying voltages of two or more values between said electrodes.

10. A liquid crystal display device according to claim 9, wherein said birefringent medium is composed of at least two transparent organic polymer films, the slow axis of each film crosses the rubbing axis of said boundary region, and assuming that the twist angle of said liquid crystal layer is θ, a product Δn·d of the thickness d(μm) and refractive index anisotropy of said liquid crystal layer is in a range of (0.0033×θ+0.1)–(0.0033×θ+0.3) μm, and a product Δn·d of the thickness d(μm) and refractive index anisotropy of said birefringent medium is in a range of (0.00025×θ–0.1)–(0.00025×θ–0.3) μm.

11. A liquid crystal display device according to claim 9, wherein said birefringent medium includes a transparent organic polymer film, the slow axis of said film crosses the rubbing axis of said boundary region, and assuming that the twist angle of said liquid crystal layer is θ, a product Δn·d of the thickness d(μm) and refractive index anisotropy of said liquid crystal layer is in a range of (0.0033×θ+0.1)–(0.0033×θ+0.3) μm, and a product Δn·d of the thickness d(μm) and refractive index anisotropy of said birefringent medium is in a range of (–0.00016×θ+0.25)–(–0.0007×θ+0.09) μm.

12. A liquid crystal display device comprising:

(a) a pair of substrates each having an electrode arranged oppositely to each other, at least one of them being transparent;

(b) a liquid crystal layer having a spiral structure, arranged between said substrates;

(c) a pair of polarizers arranged so as to sandwich said liquid crystal layer;

(d) a birefringent medium arranged between said liquid crystal layer and at least one of said polarizers, retardation in said birefringent medium being equal or close to residual retardation due to the liquid crystal molecules at boundary regions, and the slow axis of said birefringent medium being set for an angle to compensate for said residual retardation, said birefringent medium including a transparent polymer film whose slow axis crosses rubbing axes of said boundary regions, said slow axis of said polymer film being orthogonal to a vector sum in rubbing directions of said boundary regions; and (e) control structure for changing transmission of said liquid crystal layer by applying voltages of two or more values between said electrodes.

13. A liquid crystal display device comprising:

(a) a pair of substrates each having an electrode arranged oppositely to each other, at least one of them being transparent;

(b) a liquid crystal layer arranged between said substrates;

(c) a pair of polarizers arranged so as to sandwich said liquid crystal layer;

(d) a birefringent medium arranged between said liquid crystal layer and at least one of said polarizers, retardation in said birefringent medium being equal or close to residual retardation due to the liquid crystal molecules at boundary regions, and the slow axis of said birefringent medium being set for an angle to compensate for said residual retardation, said birefringent medium including two transparent organic polymer films whose slow axes cross each other, retardation in the organic polymer films being different, and wherein a difference in the retardation between adjacent stacked films is smaller than that in each individual film; and (e) control structure for changing transmission of said liquid crystal layer by applying voltages of two or more values between said electrodes.

14. A liquid crystal display device, comprising:

(a) a pair of substrates each having an electrode arranged oppositely to each other, at least one of them being transparent;

(b) a liquid crystal layer arranged between said substrates;

(c) a pair of polarizers arranged so as to sandwich -said liquid crystal layer;

(d) a birefringent medium arranged between said liquid crystal layer and at least one of said polarizers, retardation in said birefringent medium being equal or close to residual retardation due to the liquid crystal molecules at boundary regions, and the slow axis of said birefringent medium being set for an angle to compensate for said residual retardation, said birefringent medium including two transparent organic polymer films whose slow axes cross each other, and wherein each of said organic polymer films has a positive dispersion characteristic in which wavelength dispersion in birefringent retardation is different from the absolute value of retardation at a wavelength of 0.55 μm; and (e) control structure for changing transmission of said liquid crystal layer by applying voltages of two or more values between said electrodes.

15. A liquid crystal display device comprising:

(a) a pair of substrates each having an electrode arranged oppositely to each other, at least one of them being transparent;

(b) a liquid crystal layer arranged between said substrates, said liquid crystal layer having a spiral structure;

(c) a pair of polarizers arranged so as to sandwich said liquid crystal layer;

(d) a birefringent medium arranged between said liquid crystal layer and at least one of said polarizers, said birefringent medium having a retardation and a slow axis, the retardation in said birefringent medium being equal or close to a residual retardation due to the liquid crystal molecules at boundary regions, and the slow axis of said birefringent medium being set for an angle to compensate for said residual retardation; and (e) control structure for changing transmission of said liquid crystal layer by applying voltages of two or more values between said electrodes.

16. A liquid crystal display device according to claim 15, wherein said liquid crystal layer has a mode in which the transmission when a higher voltage than the lowest voltage in the voltages of two or more values is applied is lower than that when the lowest voltage is applied.

17. A liquid crystal display device according to claim 15, wherein said birefringent medium is arranged between at least one of said pair of substrates and one of said pair of polarizers.

18. A liquid crystal display device according to claim 15, wherein said liquid crystal layer is positive dielectric anisotropy having a spiral structure twisted in the thickness direction when no voltage is applied, the twist angle of said liquid crystal layer is about integer-times of 90°, the liquid crystal molecules tilted uniformly are kept in contact with said substrates and said birefringent medium, and the polarizing axes of said polarizers cross rubbing axes of said boundary regions close to said polarizers in a state with the lowest transmission.

19. A liquid crystal display device according to claim 15, wherein said liquid crystal layer has a twist angle is 90°–360° between said substrates, and the retardation in said birefringent medium of from 0.01 to under 0.25 μm.

20. A liquid crystal display device according to claim 15, wherein said liquid crystal layer has a twist angle of 180°–270° between said substrates, and the retardation in said birefringent medium is 0.1–0.2 μm.

21. A liquid crystal display device according to claim 15, wherein said liquid crystal layer has refractive index anisotropy Δn of 0.02–0.2, and a product Δn·d of the thickness (μm) of said liquid crystal layer and said refractive index anisotropy is 0.3–1.5 μm.

22. A liquid crystal display device according to claim 15, wherein each of said substrates has an electrode formed in a matrix form and an optical shading member for shading light in its non-electrode portion.

23. A liquid crystal display device according to claim 15, wherein said birefringent medium includes a transparent organic polymer film whose slow axis crosses rubbing axes of said boundary regions.

24. A liquid crystal display device according to claim 15, wherein said birefringent medium includes at least two transparent organic polymer films whose slow axes cross each other.

25. A liquid crystal display device according to claim 15, wherein a slow axis of the birefringent medium is substantially orthogonal to that of the liquid crystal layer.

26. A liquid crystal display device according to claim 15, wherein said birefringent medium is integrated with one of the pair of polarizers.

27. A liquid crystal display device according to claim 26, wherein said birefringent medium is formed of at least one polymer film, made of a material selected from the group consisting of triacetyl cellulose, polycarbonate, polyvinyl alcohol, polyethersulfone and polyethylene terephthalate.

28. A liquid crystal display device comprising:
(a) a pair of substrates each having an electrode arranged oppositely to each other, at least one of them being transparent;
(b) a liquid crystal layer arranged between said substrates;
(c) a pair of polarizers arranged so as to sandwich said liquid crystal layer;
(d) a birefringent medium arranged between said pair of substrates, said birefringent medium having a retardation and a slow axis, the retardation in said birefringent medium being equal or close to a residual retardation due to the liquid crystal molecules at boundary regions, and the slow axis of said birefringent medium being set for an angle to compensate for said residual retardation; and
(e) control structure for changing transmission of said liquid crystal layer by applying voltages of two or more values between said electrodes.

29. A liquid crystal display device comprising:
(a) a pair of substrates each having an electrode arranged oppositely to each other, at least one of them being transparent;
(b) a liquid crystal layer arranged between said substrates;
(c) a pair of polarizers arranged so as to sandwich said liquid crystal layer;
(d) a birefringent medium arranged between said liquid crystal layer and at least one of said polarizers, said birefringent medium having a retardation and a slow axis, the retardation in said birefringent medium being equal or close to a residual retardation due to the liquid crystal molecules at boundary regions, and the slow axis of said birefringent medium being set for an angle to compensate for said residual retardation, the birefringent medium including at least two different kinds of polymer films, with wavelength dispersion characteristics of refractive indices of the liquid crystal layer and the polymer films being substantially equal; and
(e) control structure for changing transmission of said liquid crystal layer by applying voltages of two or more values between said electrodes.

30. An electro-optical device for use in combination with a voltage source, comprising:
(a) liquid crystal layer including a twisted nematic liquid crystal material for producing a display in response to application of a voltage from the voltage source across the liquid crystal material, characterized by parameters including a twist angle and the product of refractive index anisotropy Δn and layer thickness d; and
(b) compensating structure adjacent to the liquid crystal layer for compensating residual retardation in the liquid crystal layer and having retardation substantially equal to residual retardation due to the liquid crystal molecules tilted in the liquid crystal layer upon application of the voltage to the liquid crystal layer.

\* \* \* \* \*